United States Patent
Arai

Patent Number: 5,864,834
Date of Patent: *Jan. 26, 1999

[54] METHOD AND APPARATUS FOR ESTIMATING A SPECIAL REFLECTANCE DISTRIBUTION OR A SPECTRAL TRANSMITTANCE DISTRIBUTION USING ILLUMINANT-INDEPENDENT CHARACTERISTIC PARAMETERS

[75] Inventor: Yoshihumi Arai, Tokyo, Japan

[73] Assignee: Tokyo Ink Manufacturing Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 409,016

[22] Filed: Mar. 23, 1995

[30] Foreign Application Priority Data

May 20, 1994 [JP] Japan .................................. 6-106716

[51] Int. Cl.$^6$ ..................................................... G06F 15/18
[52] U.S. Cl. ................................................ 706/16; 706/17
[58] Field of Search .............................. 395/22, 38, 80, 395/131; 706/16, 12; 356/402; 345/431

[56] References Cited

U.S. PATENT DOCUMENTS

| | | | |
|---|---|---|---|
| 5,025,282 | 6/1991 | Nakamura et al. | 355/38 |
| 5,162,899 | 11/1992 | Naka et al. | 358/80 |
| 5,185,850 | 2/1993 | Usui et al. | 395/22 |
| 5,386,496 | 1/1995 | Arai et al. | 395/22 |
| 5,502,799 | 3/1996 | Tsuji et al. | 395/131 |
| 5,559,604 | 9/1996 | Arai | 356/402 |
| 5,590,251 | 12/1996 | Takagi | 345/431 |

OTHER PUBLICATIONS

Shiro Usui et al., Reconstruction of munsell color space by a five layered neural network, Neural networks, 1990 IEEE International conference, pp. II–515–20.

Primary Examiner—Allen R. MacDonald
Assistant Examiner—Sanjiv Shah
Attorney, Agent, or Firm—Knobbe, Martens, Olson & Bear, LLP

[57] ABSTRACT

A neural network is made to undergo learning such that at least three characteristic parameters, which correspond to an inputted set of color information values when the set of color information values, including at least three color information values, is inputted and which are obtained by multivariate analysis of the spectral reflectance distribution or the spectral transmittance distribution, are outputted. A subject set of color information values is transformed into the characteristic parameters by using the neural network which has completed learning, and a spectral reflectance distribution or a spectral transmittance distribution is estimated by linear polynomial approximation using the transformed characteristic parameters, eigenvectors obtained by the multivariate analysis, and a mean vector of the spectral reflectance distribution or the spectral transmittance distribution.

18 Claims, 8 Drawing Sheets

FIG. 2

OUTPUT OF CHARACTERISTIC
PARAMETERS

METHOD AND APPARATUS FOR ESTIMATING A SPECIAL REFLECTANCE DISTRIBUTION OR A SPECTRAL TRANSMITTANCE DISTRIBUTION USING ILLUMINANT-INDEPENDENT CHARACTERISTIC PARAMETERS

BACKGROUND OF THE INVENTION

1. Field of the Invention

The present invention relates to a method and an apparatus for estimating a spectral reflectance distribution or a spectral transmittance distribution suitable for a device-independent color reproduction method and apparatus in, for example, color DTP. More particularly, the present invention concerns a method and an apparatus for estimating a spectral reflectance distribution or a spectral transmittance distribution, which are necessary as a color reproduction process to ensure that the appearance of a color reproduced by any color reproducing apparatus always becomes the appearance of the color of an original by being not only device-independent but illuminant-independent, by using characteristic parameters which are obtained by the multivariate analysis of the spectral reflectance distribution or the spectral transmittance distribution and which are always capable of accurately representing the physical properties of the color irrespective of the kind of illuminant as a device-independent color representation process.

2. Description of the Related Art

A so-called device-independent color reproduction method is conventionally known as a method of color reproduction in which the reproduced color is not dependent on a device and which is capable of reproducing the same color as that of an original even if the color is reproduced by any device. In this device-independent color reproduction method, color information is temporarily transformed into representations which are not dependent on the device, and color correction is then carried out.

In the above-described reproduction method, the same color as that of an original is reproduced with high accuracy without being dependent on the device, by representing the color of the original by using calorimetric values, such as CIE L*a*b*, CIE L*u*v* uniform color space, or CIE XYZ values prescribed by CIE (Commission Internationale de l'Eclairage), and then by effecting transformations between the calorimetric values and device values such as CMYK values.

However, since the CIE L*a*b*, CIE L*u*v*, CIE XYZ values, or the like are defined by the spectral distributions of illuminants, spectral reflectance distributions of the subject surfaces, and color matching functions, the above-described conventional device-independent color reproduction method has a problem in that the reproduced color does not match the color of the original unless the illuminant used for observing the color of the original is the same as the illuminant used in deriving the CIE L*a*b* values or the like.

As described above, the conventional device-independent color reproduction method has the problem that the illuminants allowing the reproduced color to appear to be the same color as the original are restricted, color matching cannot be accomplished only under very limited environments, i.e., illumination.

Meanwhile, there are various types of illumination used for observation of colors, including illumination under an incandescent lamp, illumination under a fluorescent lamp, sunlight, and so on. Therefore, the conventional device-independent color reproduction method disadvantageously makes it impossible to allow the reproduced color to always match the color of the original under such illuminants.

SUMMARY OF THE INVENTION

Accordingly, the present invention has been devised to overcome the above-described problems, and its object is to provide a method and an apparatus for estimating a spectral reflectance distribution or a spectral transmittance distribution which employ highly reliable, illuminant-independent characteristic parameters and which make it possible to ensure that the appearance of a reproduced color matches the appearance of the color of an original to be reproduced, irrespective of the illuminant used for observing the color.

To attain the above object, in accordance with the present invention, in a case where a spectral reflectance distribution or a spectral transmittance distribution of a color with a set of color information values, including at least three color information values, is estimated on the basis of the set of color information values, a neural network is caused to undergo learning such that at least three characteristic parameters, which correspond to the inputted set of color information values when the set of color information values is inputted and which are obtained by multivariate analysis of the spectral reflectance distribution or the spectral transmittance distribution, are outputted; a subject set of color information values is transformed into the characteristic parameters by using the neural network which has completed learning; and a spectral reflectance distribution or a spectral transmittance distribution is estimated by linear polynomial approximation using the transformed characteristic parameters, eigenvectors obtained by the multivariate analysis, and a mean vector of the spectral reflectance distribution or the spectral transmittance distribution.

Here, as the set of color information values, it is possible to use R (red), G (green), and B (blue) values which are the three primary colors of additive color mixture for forming a color image, C (cyan), M (magenta), and Y (yellow) values which are the three primary colors of subtractive color mixture for forming a color image, or C, M, Y, and K (black) values for forming a color image.

It is preferable to use principal-component analysis as the multivariate analysis and use eigenvectors determined by the principal-component analysis, and also to use principal components determined by the principal-component analysis as the characteristic parameters.

The neural network is preferably a multilayered feedforward neural network comprising three to five layers, and this neural network has a learning function.

It is preferable to use KL expansion as the linear polynomial approximation and use coefficients of KL expansion as the characteristic parameters.

The spectral reflectance distribution or the spectral transmittance distribution which is estimated in the above-described manner is used in reproducing the color of an original.

As described above, in accordance with the present invention, since characteristic parameters which are not dependent on an illuminant are used, and effective use is made of the learning function of the neural network, even if a color is represented by CMYK values, CMY values, or RGB values, it is possible to transform the information values on these colors into characteristic parameters with high accuracy, and to estimate a spectral reflectance distribution or a spectral transmittance distribution with a very high degree of accuracy by using the characteristic parameters determined by the transformation.

In addition, since the neural network having the learning function in the transformation of the set of color information values, such as CMYK values, CMY values, and RGB values, into the characteristic parameters, is used, the neural network which has undergone learning sufficiently is capable of obtaining an appropriate output with respect to the input data by virtue of its versatile capabilities even in cases where unknown data which were not used in learning are inputted.

Further, since the data on the spectral reflectance distribution or the spectral transmittance distribution are compresses with high efficiency by using principal-component analysis, the amount of data can be extremely small as compared to cases where the spectral reflectance distributions or the spectral transmittance distributions are used as they are. For this reason, the time required for transformation can be reduced. Accordingly, it is possible to estimate the spectral reflectance distribution or the spectral transmittance distribution from the set of color information values, such as CMYK values or RGB values, without spectrophotometry, which was impossible with the conventional art. In addition, in the field of color DTP, if the characteristic parameters determined by principal-component analysis are used in the representation of the halftone of color in the same way as CIE L*a*b* values and CIE XYZ values, it becomes possible to realize not only a device-independent but also an illuminant-independent color reproduction method.

It is conventionally known that the spectral reflectance distribution can be approximated with high accuracy with a small number of characteristic parameters if eigenvectors obtained by the principal-component analysis of the spectral reflectance distribution are used, and many studies have been reported. Among models describing the color constancy phenomenon in the color perception by higher animals such as humans and monkeys, in color perception models for estimating the spectral reflectance distribution of an object's surface from the amount of response from three kinds of cone, which are kinds of optical sensors, the hypothesis is used that the spectral reflectance distributions of colors existing in the natural world can be approximated with high accuracy by three characteristic vectors. Because the estimated results of the models are in good agreement with the actual spectral reflectance distributions, it is generally accepted today as a known fact that such a hypothesis is valid.

In the present invention, in the field of color reproduction, such a fact is actually applied to the issue of estimating a spectral reflectance distribution or a spectral transmittance distribution directly from color separation values such as CMYK values, so as to artificially realize the estimation of the spectral reflectance distribution or the spectral transmittance distribution.

Namely, in the present invention, a set of color information values such as CMYK values and RGB values in a color reproducing apparatus is transformed into characteristic parameter values which are obtained by a technique of multivariate analysis of the spectral reflectance distribution or spectral transmittance distribution of a color with the set of color information values. Then, a corresponding spectral reflectance distribution or spectral transmittance distribution is estimated by the linear polynomial approximation technique using the output values of the neural network which has completed learning, the mean vector of spectral reflectance distributions determined in advance, and eigenvectors.

The above and other objects, features and advantages of the present invention will become more apparent from the following detailed description of the invention when read in conjunction with the accompanying drawings.

DESCRIPTION OF THE PREFERRED EMBODIMENT

Figure 1:
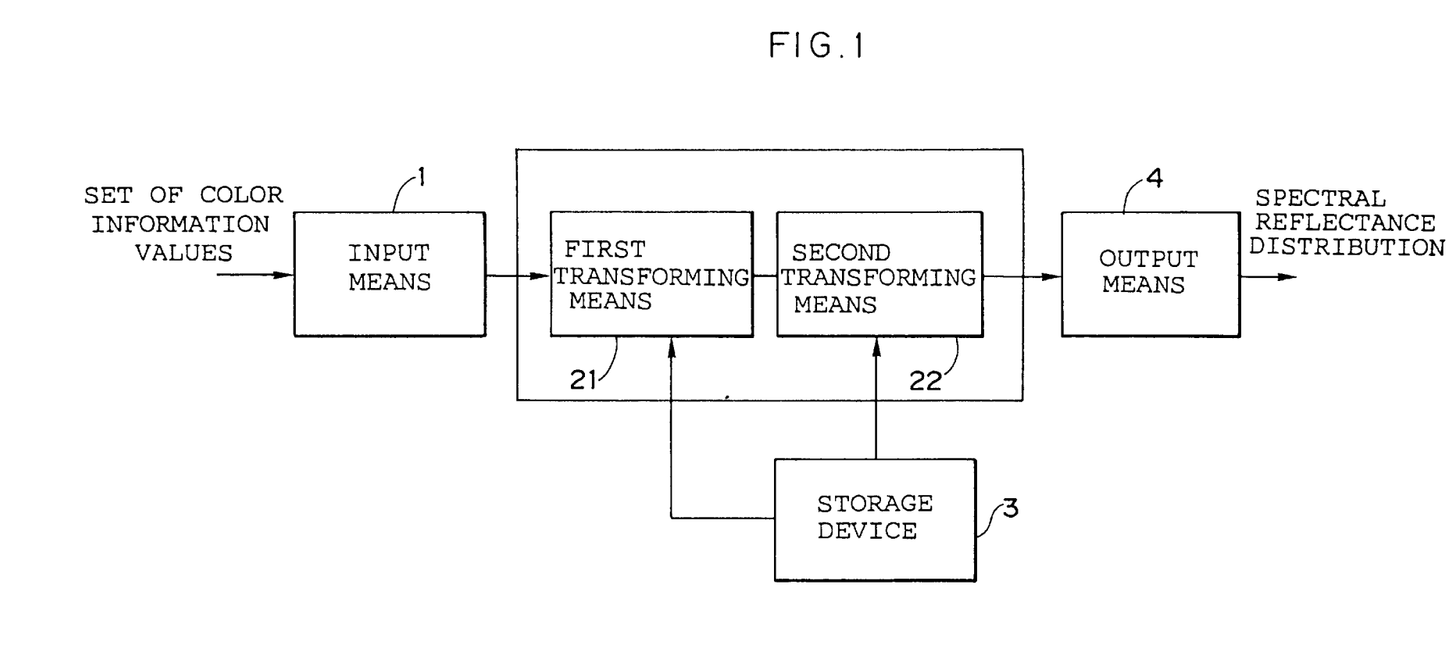
FIG. 1 is a functional block diagram illustrating an embodiment of a color information processor which is not dependent on an illuminant in accordance with the present invention.

FIG. 1 is a schematic diagram of an apparatus for estimating a spectral reflectance distribution in which a set of color information values, such as CMYK values, CMY values, and RGB values, is transformed into characteristic parameter values obtained by a technique of multivariate analysis of the spectral reflectance distribution of a color with the set of color information values, and output values of a neural network which has completed learning are transformed into a corresponding spectral reflectance distribution by the linear polynomial approximation technique using a mean vector of spectral reflectance distributions determined in advance.

As shown in the drawing, this apparatus for estimating a spectral reflectance distribution is comprised of an input means 1, a transforming device having a first transforming means 2 and a second transforming means 22, a storage device 3, and an output means 4.

The input means 1 transforms a set of color information values into electrical signals corresponding to the set of color information values.

Figure 2:
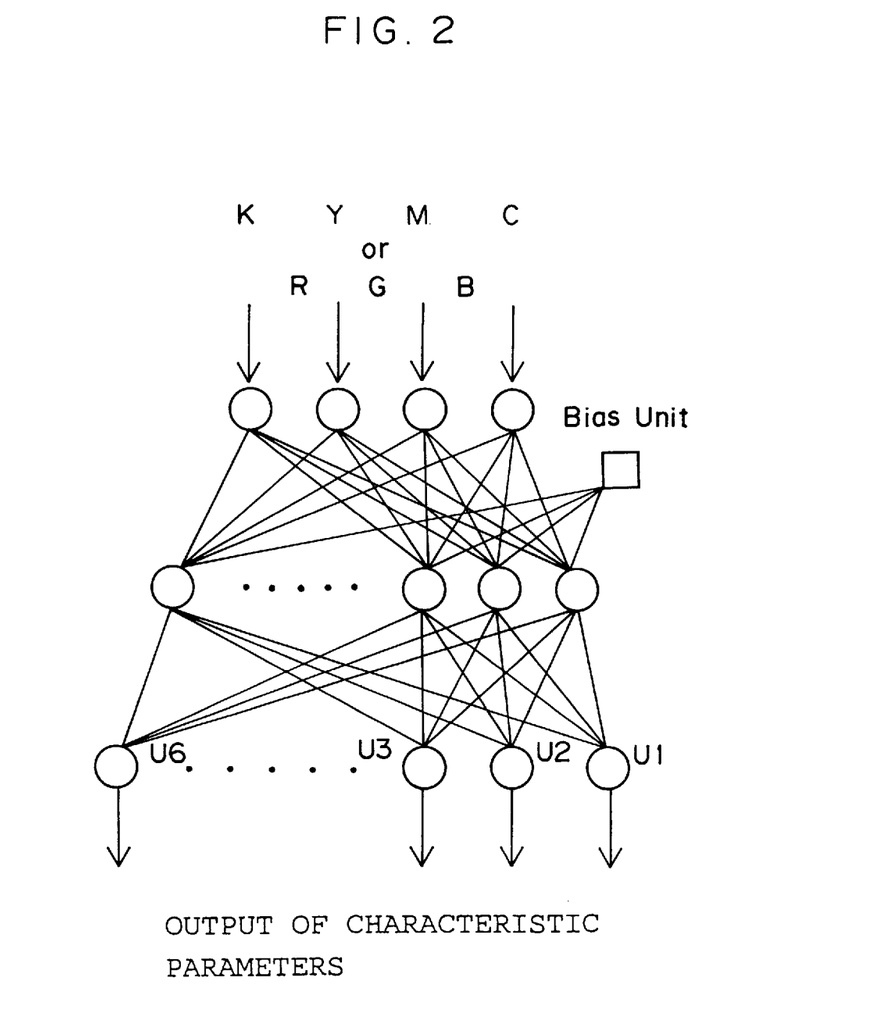
FIG. 2 is a schematic diagram illustrating a configuration of a feedforward connection-type neural network used in a first transforming means in the embodiment.

The first transforming means 21 transforms the electrical signals from the input means 1 into characteristic parameters obtained by multivariate analysis of the spectral reflectance distribution. The first transforming means 21 is constituted by a neural network, and has a transforming function, which will be described later, as well as a learning function for learning the same. As shown in FIG. 2, the neural network used as the first transforming means 21 is comprised of an input layer having four units, an intermediate layer having a multiplicity of units, and an output layer having three to six units U1, U2, . . . , U6. The units of the intermediate layer are connected to a bias unit.

The units of the intermediate layer constituted by neural circuit elements in which input and output relationships are expressed by sigmoid functions, while the units of the input and output layers are constituted by neural circuit elements in which input and output relationships are linear. The units of the output layer may also be constituted by neural circuit elements in which input and output relationships have a sigmoid characteristic, in the same way as the units of the intermediate layer. The number of output units of the output layer corresponds to the number of characteristic parameters which are obtained by multivariate analysis of spectral reflectance distributions, and four is normally preferable.

The second transforming means 22 transforms an output from the first transforming means 21 into spectral reflectance distributions through KL expansion by using eigenvalues obtained by multivariate analysis of spectral reflectance distributions as well as a mean vector of the spectral reflectance distributions.

Meanwhile, stored in the storage device 3 are the eigenvalues, which are determined in advance by performing multivariate analysis of spectral reflectance distributions, the mean vector of the spectral reflectance distributions, and coefficients of connection, i.e., weights, of the neural network which has completed learning.

In addition, the output means 4 delivers outputs from the second transforming means 22 as arbitrary output signals such as electrical signals or optical signals.

Next, referring to the drawings, a description will be given of the operation of the apparatus for estimating a spectral reflectance distribution in accordance with this embodiment which is arranged as described above.

In FIG. 1, the set of color information values, including at least three color information values, are inputted to the input means 1, and are transformed into electrical signals corresponding to the respective set. Namely, color separation values, such as CMYK values, CMY values, or RGB values, of an original color to be subjected to transformation in the set of color information are supplied as data, and are outputted as arbitrary signals such as electrical signals.

Next, the signals outputted from the input means 1 are inputted to the first transforming means 21. In the first transforming means, when the color separation values, such as CMYK values and RGB values, are supplied as its inputs, an output $H_i$ is outputted from each unit of the intermediate layer of the neural network in accordance with the following formula:

$$H_i = f(net_i)$$

$$net = \sum_{i=1}^{m} \sum_{j=1}^{n} W^{(h)}_{ij} I_j + b_i \quad (1)$$

where $W^{(h)}_{ij}$ represents a coefficient of connection between a j-th unit of the input layer and an i-th unit of the intermediate layer, i.e., a weight; $I_j$ represents an output of the j-th unit of the input layer; and $b_i$ represents a bias value supplied from the bias unit. Also, an output Oi of the unit of the output layer is similarly expressed as shown in the following formula:

$$O_i = f(net_i) \quad (2)$$

$$net = \sum_{i=1}^{k} \sum_{j=1}^{m} W^{(o)}_{ij} H_j + b_i$$

where $W^{(o)}_{ij}$ represents a coefficient of connection between the j-th unit of the intermediate layer and the i-th unit of the output layer; and $H_j$ is the output value of the j-th unit of the intermediate layer, which is defined by Formula (1). In addition, n, m, and k are the numbers of units of the input layer, the intermediate layer, and the output layer, respectively.

At this time, the characteristic of each unit of the input layer is one in which the input is outputted as it is. Meanwhile, the coefficient of connection of each unit of the intermediate layer has a characteristic which is expressed by a sigmoid function that increases monotonously in a section [0, 1] defined by the following formula:

$$f(x) = 1/(1 + e^{-x}) \quad (3)$$

Meanwhile, the unit of the output layer has a characteristic which is expressed by a sigmoid function or a linear function. However, the unit of the output layer may have an input from the bias unit.

The coefficients of connection of this neural network are learned in advance in such a manner as to minimize a square error between the output of each unit of the output layer and a teacher signal, i.e., a characteristic parameter determined by the principal-component analysis of the spectral reflectance distribution. The back propagation learning rule proposed by Rumelhert is employed in this learning, and the transformation from CMYK values, RGB values or the like into characteristic parameters obtained by the principal-component analysis of the spectral reflectance distribution is learned.

Next, a description will be given of KL expansion. An eigenvector determined by the principal-component analysis is defined as a solution of a characteristic equation defined by the following formulae by using a covariance matrix of spectral reflectance distributions of various colors.

$$\Phi v^i = \lambda_i v^i$$

$$(v^i)^t v^i = 1 \quad (4)$$

where $i = 1, 2, \ldots, r$; $\Phi$ represents a covariance matrix defined by the formula shown below; $\lambda_i$ represents an eigenvalue; $v^i$ represents an eigenvector; and t represents transposition.

$$\Phi = E[\hat{R}\hat{R}^t] \quad (5)$$

where $\hat{R} = R - ER$; ER represents a mean vector (one in which all the spectral reflectance distributions of various colors are averaged) of spectral reflectance distributions; E[ ] represents a mean of the values within the bracket [ ].

In addition, characteristic parameters $Y_i$, i.e., principal components, are calculated by the following formula by using the eigenvectors $v^i$ obtained from Formula (4):

$$Y_i = \langle (v^i)^t \hat{R} \rangle \quad (6)$$

where <> represents an inner product.

As the characteristic parameters $Y_i$, four principal components $Y_1$ to $Y_4$ are used in this embodiment.

Next, the signals transformed by the neural network which completed learning in the first transforming means 21 are introduced into the second transforming means 22, and are transformed into a spectral reflectance distribution R in accordance with the following formula, by using the characteristic parameters $Y_i$, the eigenvectors, and the mean vector ER of spectral reflectance distributions:

$$\overline{R} = ER + \sum_{i=1}^{k} Y_i v^i = ER + Y_1 v^i + Y_2 v^2 + Y_3 v^3 + Y_4 v^4 \quad (7)$$

The spectral reflectance distributions obtained by the transformation are delivered to the output means 4 where they are transformed into arbitrary signals, such as electrical communication signals or optical signals.

In a case where this apparatus for estimating a spectral reflectance distribution is applied to a color reproducing apparatus, a color corresponding to a subject set of color information values is reproduced by using the spectral reflectance distributions estimated by the color reproducing apparatus.

Next, as a preferred example, a description will be given of a case where CMYK values for a thermal transfer-type printer for proofing are used. In this embodiment, one of the illuminant A, the illuminant D65, and the illuminant D50 which are specified by CIE is used as the illuminant.

First, the respective spectral reflectance distributions of color chips of 1296 ($6^4$) colors, which are represented by combinations of CMYK values prepared at dot size intervals of 20% from 0 to 100%, are photometrically measured by a spectrophotometer. Since the spectral reflectances of these color chips are intrinsic physical characteristics which are independent of an illuminant, the colors can always be represented accurately irrespective of the types of illuminant. Next, the mean vector ER of the total spectral reflectance distributions, as well as data in which this mean vector ER is subtracted from the spectral reflectance distribution R of each color, are determined, and the covariance matrix $\Phi$ is determined by using Formula (5) above.

Figure 3:
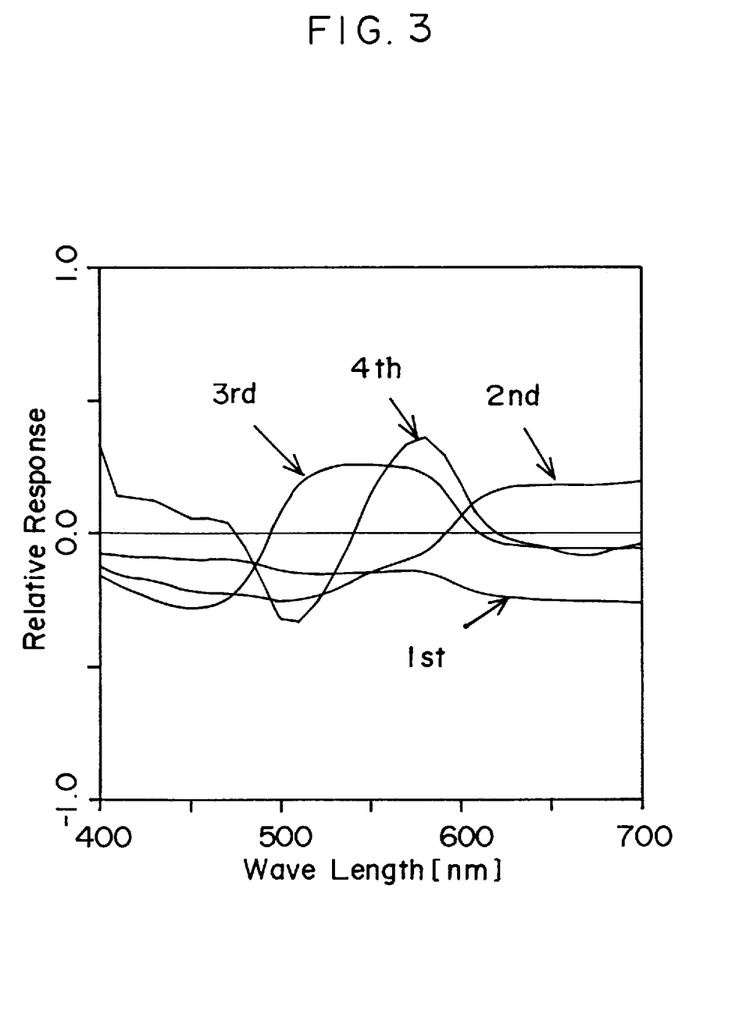
FIG. 3 is a diagram illustrating eigenvectors (principal-component vectors) of spectral reflectance distributions derived in the embodiment.

Then, the characteristic equation in Formula (4) is calculated to perform principal-component analysis. From the result of the principal-component analysis, an eigenvector (principal-component vector) such as the one shown in FIG. 3 is obtained. In FIG. 3, however, the first to fourth principal-component vectors are shown. The eigenvectors $v^i$ thus calculated and the mean vector ER of spectral reflectance distributions are stored in advance in the storage device 3, and are used in estimating the spectral reflectance distribution by KL expansion.

Next, the characteristic parameters $Y_i$ for representing the spectral reflectance distributions are calculated in accordance with Formula (6) by using the eigenvectors $v^i$ obtained by the above-described principal-component analysis and the data in which the mean vector ER is subtracted from the spectral reflectance distribution R of each color.

Then, learning is effected such that each set of CMYK values is transformed into a set of characteristic parameters by using as teacher signals the characteristic parameters determined by the principal-component analysis of the spectral reflectance distribution, the coefficients of connection of the respective units are calculated, and the coefficients of connection are stored in the storage device 3.

Figure 4:
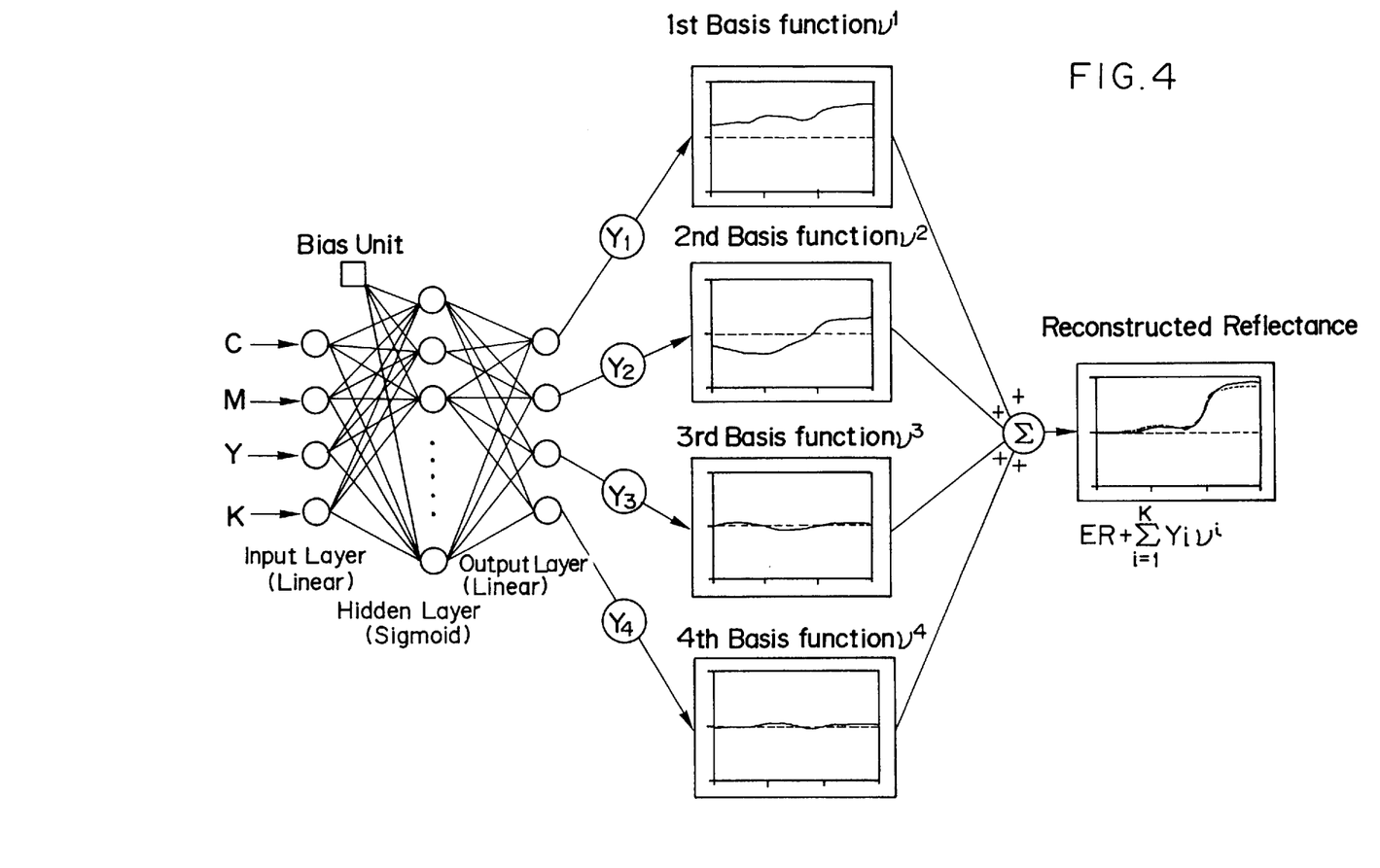
FIG. 4 is a schematic diagram illustrating the flow for estimating a spectral reflectance distribution by using eigenvectors and characteristic parameters.

The inputted color information values for each color are transmitted to the converting means 21, and are transformed into the characteristic parameters by using the neural network which has learned in advance. The transformation into a spectral reflectance distribution is effected in accordance with Formula (7) by using the characteristic parameters thus determined as well as the eigenvectors and the mean vector which are stored in the storage device. FIG. 4 is a schematic diagram of this processing.

Figure 5A:
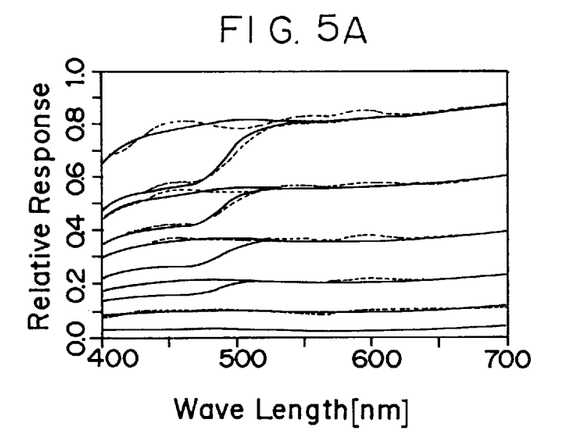
FIG. 5A and FIG. 5B are diagrams illustrating the results of comparison between the estimated spectral reflectance distributions and original spectral reflectance distributions.
Figure 5B:
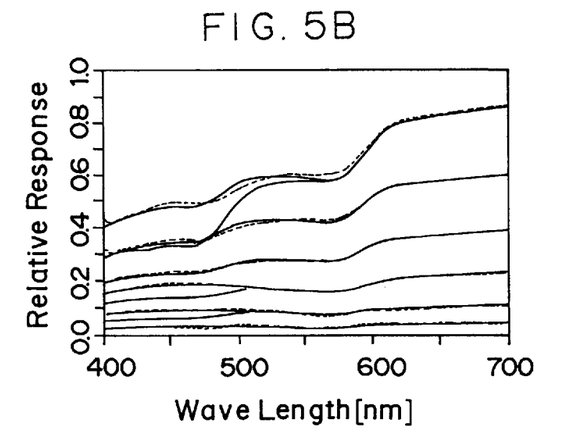
Figure 6:
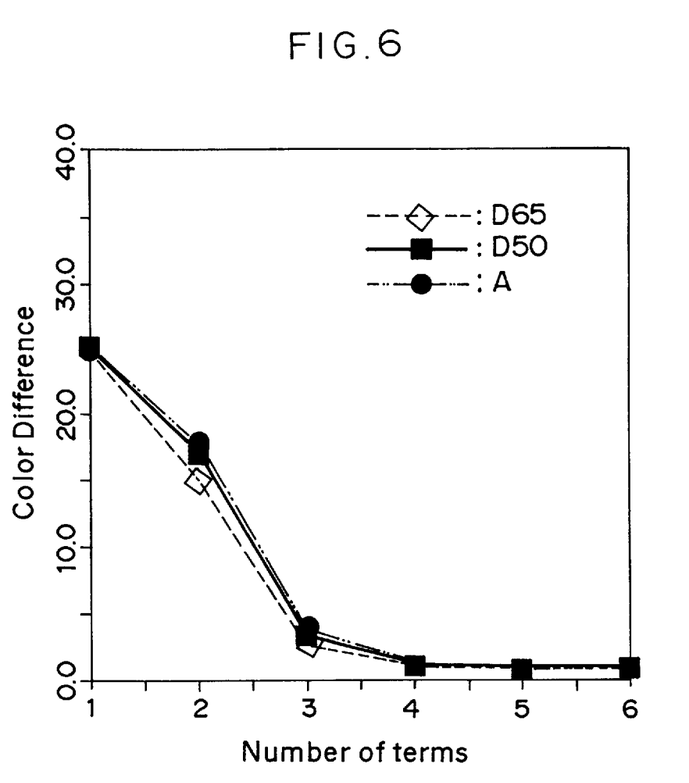
FIG. 6 is a diagram illustrating the results of comparison of estimation error with respect to three kinds of illuminants in a case where the spectral reflectance distributions are estimated by varying the number of characteristic parameters from one to six.

FIG. 5A and FIG. 5B show the results of comparison between original spectral reflectance distributions and the spectral reflectance distributions determined in accordance with this embodiment. In the drawing, the thick solid lines indicate the original spectral reflectance distributions, and the thin solid lines indicate the estimated spectral reflectance distributions. Furthermore, in order to quantitatively show the accuracy of estimating the spectral reflectance distributions estimated as a result of this embodiment, FIG. 6 shows mean color differences with respect to all the test data when the number of characteristic parameters was changed from one to six by using the aforementioned illuminants. As is apparent from the results, when four terms are used in approximation, the mean color difference becomes fixed and the value of the color difference is sufficiently small. However, the color difference is defined by the following formula:

$$\Delta E = \sqrt{\{(L_0^* - L_1^*)^2 + (a_0^* - a_1^*)^2 + (b_0^* - b_1^*)^2\}} \quad (8)$$

In addition, L*, a*, and b* are respectively defined by the following formulae:

$$L^* = 116 \left( \frac{Y}{Y_0} \right)^{1/3} - 16$$

$$a^* = 500 \left[ \left( \frac{X}{X_0} \right)^{1/3} - \left( \frac{Y}{Y_0} \right)^{1/3} \right]$$

$$b^* = 200 \left[ \left( \frac{Y}{Y_0} \right)^{1/3} - \left( \frac{Z}{Z_0} \right)^{1/3} \right]$$

where $$X = \sum_{\lambda=380}^{780} S(\lambda) R(\lambda) \overline{x}(\lambda) d\lambda$$

$$Y = \sum_{\lambda=380}^{780} S(\lambda) R(\lambda) \overline{y}(\lambda) d\lambda$$

$$Z = \sum_{\lambda=380}^{780} S(\lambda) R(\lambda) \overline{z}(\lambda) d\lambda$$

Figure 7:
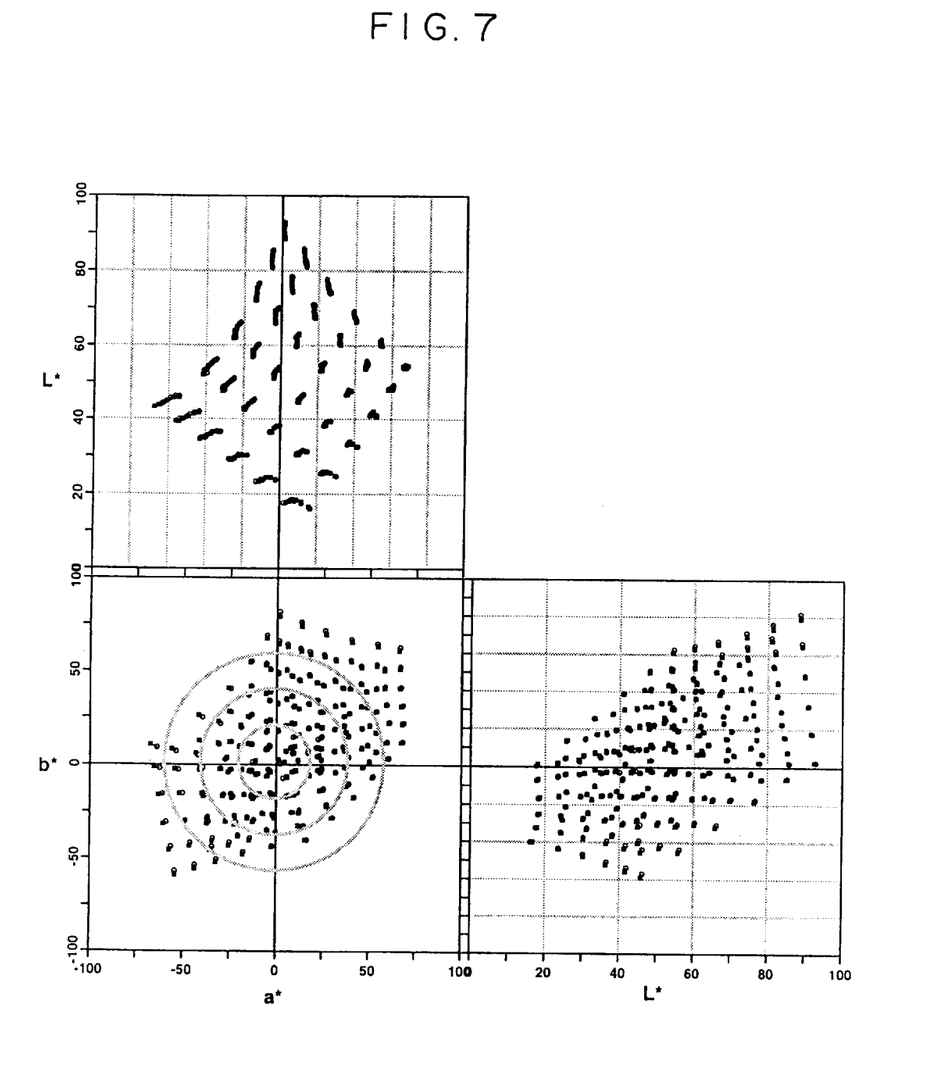
FIG. 7 is a diagram in which the estimation accuracy of the spectral reflectance distribution in a case where four characteristic parameters are used is compared with an original in the CIE L*a*b* space.
Figure 8A:
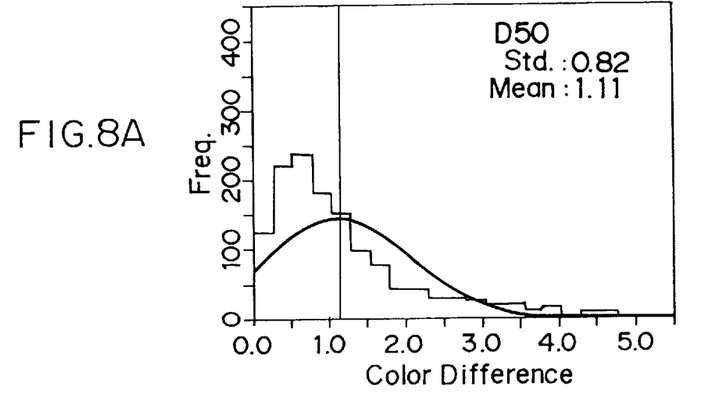
FIG. 8A, FIG. 8B, and FIG. 8C are histograms illustrating the results in which the estimated results of the spectral reflectance distribution are evaluated by color difference under three kinds of illuminants.
Figure 8B:
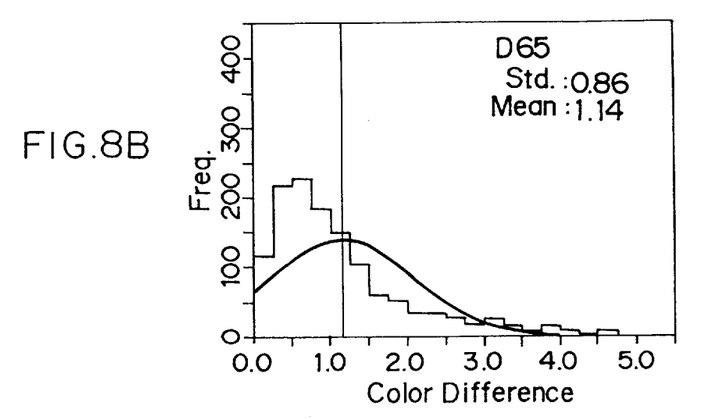
Figure 8C:
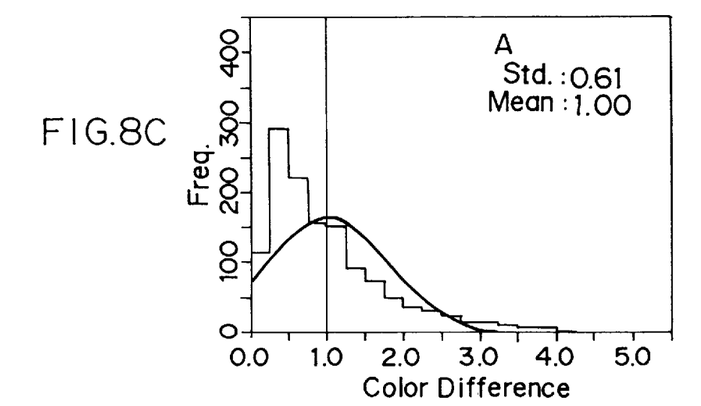

This is also apparent from FIG. 7 in which 216 colors selected from all the test data are plotted in the CIE L*a*b* space, as well as from the histograms, shown in FIG. 8A, FIG. 8B, and FIG. 8C, concerning the approximation error of all the test data.

As described above, in the method and apparatus for estimating a spectral reflectance distribution using characteristic parameters which are not dependent on an illuminant, it becomes possible to realize the transformation from color separation values, such as RGB values and CMYK values into characteristic parameters obtained by the principal-component analysis of the spectral reflectance distribution by using a neural network having a learning function, and it becomes possible to estimate a spectral reflectance distribution substantially identical to the spectral reflectance distribution of the color of a subject original on the basis of the color separation values, such as RGB values and CMYK values, by KL expansion using the characteristic parameters obtained by the transformation and independent of the illuminant.

As described above, in accordance with this embodiment, there are provided an input means for converting a set of color information values, including at least three color information values concerning the color; a first transforming means for transforming the signals from the input means into characteristic parameter values determined by multivariate analysis; a storage device for storing eigenvectors determined in advance by the principal-component analysis of the spectral reflectance distribution, a mean vector of the spectral reflectance distribution, and coefficients of connection of the neural network which has completed learning in advance; a second transforming means for transforming the output of the first transforming means into a spectral reflectance distribution of the color corresponding to the set of color information values by KL expansion using the eigenvectors and the mean vector stored in advance in the storage device; and an output means for outputting the output of the second transforming means as an arbitrary output signal. Since the neural network having a learning function is used in effecting the transformation of color information, it is possible to obtain an appropriate output with respect to the input data even in cases where unknown data which were not used in learning are inputted, by virtue of the versatile capabilities of the neural network which has undergone learning sufficiently. For this reason, it is possible to effect a transformation with high accuracy from the set of information values concerning the color into characteristic parameters for representing the spectral reflectance distribution, and it is possible to realize the estimation of a very accurate spectral reflectance distribution by effecting KL expansion by using the characteristic parameters determined by the transformation.

Although, in the above-described embodiment, a description has been given of an example in which the spectral reflectance distribution is estimated, the present invention can be similarly applied to cases where the spectral transmittance distribution is estimated.

What is claimed is:

1. A method of estimating a spectral reflectance distribution or a spectral transmittance distribution of a color with a set of device values used for color reproduction with a color reproduction apparatus, including at least three device values used for color reproduction with a color reproduction apparatus, on the basis of the set of device values used for color reproduction with a color reproduction apparatus, comprising the steps of:

causing a neural network to undergo learning such that at least three principal components, which correspond to the inputted set of device values used for color reproduction with a color reproduction apparatus when the set of device values used for color reproduction with a color reproduction apparatus is inputted and which are obtained by multivariate analysis of the spectral reflectance distribution or the spectral transmittance distribution, are outputted;

transforming a subject set of device values used for color reproduction with a color reproduction apparatus into the principal components by using said neural network which has completed learning; and estimating a spectral reflectance distribution or a spectral transmittance distribution by linear polynomial approximation using the transformed characteristics parameters, eigenvectors obtained by the multivariate analysis, and a mean vector of the spectral reflectance distribution or the spectral transmittance distribution.

2. A method of estimating a spectral reflectance distribution or a spectral transmittance distribution according to claim 1, wherein the learning step is effected by:

measuring the spectral reflectance distribution of each a multiplicity of color chips corresponding to the at least three device values used for color reproduction with a color reproduction apparatus and each having a color whose density differs for each of the device values used for color reproduction with a color reproduction apparatus;

determining an eigenvector by performing principal-component analysis by using a covariance matrix of values in each of which the mean vector of the spectral reflectance distribution is subtracted from the spectral reflectance distribution;

determining the at least three principal components corresponding to each of sets of device values used for color reproduction with a color reproduction apparatus, including at least three device values used for color reproduction with a color reproduction apparatus, by using the determined eigenvector and the values in each of which the mean vector of the spectral reflectance distribution is subtracted from the spectral reflectance distribution; and causing said neural network to undergo learning by using the sets of device values used for color reproduction with a color reproduction apparatus and the principal components such that the at least three characteristics parameters corresponding to the set of device values used for color reproduction with a color reproduction apparatus are outputted when the set of device values used for color reproduction with a color reproduction apparatus including the at least three device values used for color reproduction with a color reproduction apparatus is inputted.

3. A method of estimating a spectral reflectance distribution or a spectral transmittance distribution according to claim 1, wherein the set of device values used for color reproduction with a color reproduction apparatus is RGB values which are three primary colors of additive color mixture, CMY values which are three primary colors of subtractive primary colors, or CMYK values.

4. A method of estimating a spectral reflectance distribution or a spectral transmittance distribution according to claim 1, wherein said neural network is a multilayered feedforward neural network comprising three to five layers.

5. A method of estimating a spectral reflectance distribution or a spectral transmittance distribution according to claim 1, wherein KL expansion is used as the linear polynomial approximation, and coefficients of KL expansion are used as the principal components.

6. An apparatus for estimating a spectral reflectance distribution or a spectral transmittance distribution of a color with a set of device values used for color reproduction with a color reproduction apparatus, including at least three device values used for color reproduction with a color reproduction apparatus, on the basis of the set of device values used for color reproduction with a color reproduction apparatus, comprising:

a neural network for learning such that at least three principal components, which correspond to the inputted set of device values used for color reproduction with a color reproduction apparatus when the set of device values used for color reproduction with a color reproduction apparatus is inputted and which are obtained by multivariate analysis of the spectral reflectance distribution or the spectral transmittance distribution, are outputted; and estimating means for estimating a spectral reflectance distribution or a spectral transmittance distribution by linear polynomial approximation using the transformed characteristics parameters, eigenvectors obtained by the multivariate analysis, and a mean vector of the spectral reflectance distribution or the spectral transmittance distribution.

7. An apparatus for estimating a spectral reflectance distribution or a spectral transmittance distribution according to claim 6, wherein said neural network measures the spectral reflectance distribution of each a multiplicity of color chips corresponding to the at least three device values used for color reproduction with a color reproduction apparatus and each having a color whose density differs for each of the device values used for color reproduction with a color reproduction apparatus;

determines an eigenvector by performing principal-component analysis by using a covariance matrix of values in each of which the mean vector of the spectral reflectance distribution is subtracted from the spectral reflectance distribution;

determines the at least three principal components corresponding to each of sets of device values used for color reproduction with a color reproduction apparatus, including at least three device values used for color reproduction with a color reproduction apparatus, by using the determined eigenvector and the values in each of which the mean vector of the spectral reflectance distribution is subtracted from the spectral reflectance distribution; and undergoes learning by using the sets of device values used for color reproduction with a color reproduction apparatus and the principal components such that the at least three characteristics parameters corresponding to the set of device values used for color reproduction with a color reproduction apparatus are outputted when the set of device values used for color reproduction with a color reproduction apparatus, including the at least three device values used for color reproduction with a color reproduction apparatus, is inputted.

8. An apparatus for estimating a spectral reflectance distribution or a spectral transmittance distribution according to claim 6, wherein the set of device values used for color reproduction with a color reproduction apparatus is RGB values which are three primary colors of additive color mixture, CMY values which are three primary colors of subtractive primary colors, or CMYK values.

9. An apparatus for estimating a spectral reflectance distribution or a spectral transmittance distribution according to claim 6, wherein said neural network is a multilayered feedforward neural network comprising three to five layers.

10. An apparatus for estimating a spectral reflectance distribution or a spectral transmittance distribution according to claim 6, wherein KL expansion is used as the linear polynomial approximation, and coefficients of KL expansion are used as the principal components.

11. An apparatus for estimating a spectral reflectance distribution or a spectral transmittance distribution of a color with a set of device values used for color reproduction with a color reproduction apparatus, including at least three device values used for color reproduction with a color reproduction apparatus on the basis of the set of device values used for color reproduction with a color reproduction apparatus, comprising:

input means to which a set of device values used for color reproduction with a color reproduction apparatus, including at least three device values used for color reproduction with a color reproduction apparatus, is inputted and which converts the inputted set of device values used for color reproduction with a color reproduction apparatus into corresponding electrical signals;

a storage device for storing eigenvectors obtained by multivariate analysis, a mean vector of the spectral reflectance distribution or the spectral transmittance distribution, coefficients of connection learned by a neural network;

said neural network for converting the electrical signals from said input means into electrical signals corresponding to at least three parameters and corresponding to the inputted electrical signals and obtained by the multivariate analysis of the spectral reflectance distribution or the spectral transmittance distribution, and for outputting the same: and estimating means for estimating a spectral reflectance distribution or a spectral transmittance distribution by the electrical signals outputted from said neural network and by linear polynomial approximation using the eigenvectors and the mean vector which are stored in said storage means.

12. An apparatus for estimating a spectral reflectance distribution or a spectral transmittance distribution according to claim 11, further comprising:

output means for outputting the spectral reflectance distribution or the spectral transmittance distribution estimated by said estimating means as an output signal of a predetermined form.

13. An apparatus for estimating a spectral reflectance distribution or a spectral transmittance distribution according to claim 11, wherein said neural network measures the spectral reflectance distribution of each a multiplicity of color chips corresponding to the at least three device values used for color reproduction with a color reproduction apparatus and each having a color whose density differs for each of the device values used for color reproduction with a color reproduction apparatus;

determines an eigenvector by performing principal-component analysis by using a covariance matrix of values in each of which the mean vector of the spectral reflectance distribution is subtracted from the spectral reflectance distribution;

determines the at least three principal components corresponding to each of sets of device values used for color reproduction with a color reproduction apparatus, including at least three device values used for color reproduction with a color reproduction apparatus, by using the determined eigenvector and the values in each of which the mean vector of the spectral reflectance distribution is subtracted from the spectral reflectance distribution; and undergoes learning by using the sets of device values used for color reproduction with a color reproduction apparatus and the principal components such that the at least three characteristics parameters corresponding to the set of device values used for color reproduction with a color reproduction apparatus are outputted when the set of device values used for color reproduction with a color reproduction apparatus, including the at least three device values used for color reproduction with a color reproduction apparatus, is inputted.

14. An apparatus for estimating a spectral reflectance distribution or a spectral transmittance distribution according to claim 11, wherein the set of device values used for color reproduction with a color reproduction apparatus is RGB values which are three primary colors of additive color mixture, CMY values which are three primary colors of subtractive primary colors, or CMYK values.

15. An apparatus for estimating a spectral reflectance distribution or a spectral transmittance distribution according to claim 11, wherein said neural network is a multilayered feedforward neural network comprising three to five layers.

16. An apparatus for estimating a spectral reflectance distribution or a spectral transmittance distribution according to claim 11, wherein KL expansion is used as the linear polynomial approximation, and coefficients of KL expansion are used as the principal components.

17. A method of estimating a spectral reflectance distribution or a spectral transmittance distribution of a color, specific to a subject color-reproducing apparatus, comprising the steps of:

causing a neural network to undergo learning specifically for the color-reproducing apparatus, to output at least three principal components when a set of at least three device values used for color reproduction with a color reproduction apparatus of a color, which has a spectral reflectance distribution or a spectral transmittance distribution, is inputted into the color-reproducing apparatus, based on multivariate analysis of the spectral reflectance distribution or the spectral transmittance distribution;

correlating a set of the device values used for color reproduction with a color reproduction apparatus of a color with a spectral reflectance distribution or a spectral transmittance distribution of the color, by using a linear polynomial approximation using the principal components, eigenvectors obtained by the multivariate analysis, and a mean vector of the spectral reflectance distribution or the spectral transmittance distribution;

inputting a set of the device values used for color reproduction with a color reproduction apparatus of a subject color into the color-reproducing apparatus; and     estimating a spectral reflectance distribution or a spectral transmittance distribution of the subject color, based on the correlation between a set of the device values used for color reproduction with a color reproduction apparatus with a spectral reflectance distribution or a spectral transmittance distribution, using the neural network which has completed learning.

18. A method of reproducing a color using a color-reproducing apparatus, comprising the steps of:

causing a neural network to undergo learning specifically for the color-reproducing apparatus, to output at least three principal components when a set of at least three device values used for color reproduction with a color reproduction apparatus of a color, which has a spectral reflectance distribution or a spectral transmittance distribution, is inputted into the color-reproducing apparatus, based on multivariate analysis of the spectral reflectance distribution or the spectral transmittance distribution;

correlating a set of the device values used for color reproduction with a color reproduction apparatus of a color with a spectral reflectance distribution or a spectral transmittance distribution of the color, by using a linear polynomial approximation using the principal components, eigenvectors obtained by the multivariate analysis, and a mean vector of the spectral reflectance distribution or the spectral transmittance distribution;

inputting a set of the device values used for color reproduction with a color reproduction apparatus of a subject color into the color-reproducing apparatus;

estimating a spectral reflectance distribution or a spectral transmittance distribution of the subject color, based on the correlation between a set of the device values used for color reproduction with a color reproduction apparatus with a spectral reflectance distribution or a spectral transmittance distribution, using the neural network which has completed learning; and     reproducing a color using the color-reproducing apparatus based on the estimated spectral reflectance distribution or spectral transmittance distribution of the subject color.

\* \* \* \* \*

UNITED STATES PATENT AND TRADEMARK OFFICE
CERTIFICATE OF CORRECTION

PATENT NO. : 5,864,834
DATED : January 26, 1999
INVENTOR(S) : Yoshihumi Arai

It is certified that error appears in the above-identified patent and that said Letters Patent is hereby corrected as shown below:

On the title page: Item [73] Assignee, delete "Tokyo Ink Manufacturing Co., Ltd." and insert --Toyo Ink Manufacturing Co., Ltd.--.

Signed and Sealed this

Fifteenth Day of June, 1999

Attest:

Q. TODD DICKINSON

Attesting Officer

Acting Commissioner of Patents and Trademarks